United States Patent [19]

Saegusa et al.

[11] Patent Number: 4,914,465
[45] Date of Patent: Apr. 3, 1990

[54] SINGLE-REFLEX CAMERA DRIVEN BY MOTOR

[75] Inventors: Takashi Saegusa, Kawasaki; Kimio Uematsu, Tokyo; Yoshiyuki Daimon, Yokohama, all of Japan

[73] Assignee: Nikon Corporation, Tokyo, Japan

[21] Appl. No.: 356,374

[22] Filed: May 24, 1989

[30] Foreign Application Priority Data

May 27, 1988 [JP] Japan .................................. 63-129576

[51] Int. Cl.⁴ .......................... G03B 7/08; G03B 19/12
[52] U.S. Cl. ...................................... 354/412; 354/152
[58] Field of Search ............... 354/410, 412, 152, 153, 354/484

[56] References Cited

U.S. PATENT DOCUMENTS

| | | | |
|---|---|---|---|
| 3,906,527 | 9/1975 | Erlichman | 354/152 |
| 3,911,454 | 10/1975 | Ohmori | 354/152 X |
| 4,204,759 | 5/1980 | Yamada et al. | 354/152 |
| 4,272,171 | 6/1981 | Hashimoto et al. | 354/152 |
| 4,659,202 | 4/1987 | Sadre-Marandi et al. | 354/152 |
| 4,841,327 | 6/1989 | Yamamoto et al. | 354/412 |

Primary Examiner—W. B. Perkey
Attorney, Agent, or Firm—Shapiro and Shapiro

[57] ABSTRACT

A single-reflex camera is provided with a movable mirror provided on a photographing optical path; a driver circuit connected to an electrical motor so as to drive the movable mirro, the driver circuit being arranged to cause the movable mirror to move out of the photographing optical path in a first cycle of driving prior to exposure and to cause the movable mirror to move onto the photographing optical path in a second cycle of driving following the first cycle of driving; a photometer circuit arranged to receive a portion of the light flux which passes through the photographing optical path and which is incident upon the movable mirror and then to generate information concerning the brightness of an object; a first timer circuit for counting the time period required for the first cycle of driving of the driver; and a second timer circuit for determining, on the basis of the required time period counted by the first timer circuit; the time interval between the starting of the first cycle of driving of the driver circuit and the starting of the operation of the photometer circuit.

5 Claims, 8 Drawing Sheets

FIG.6A
FIG.6B
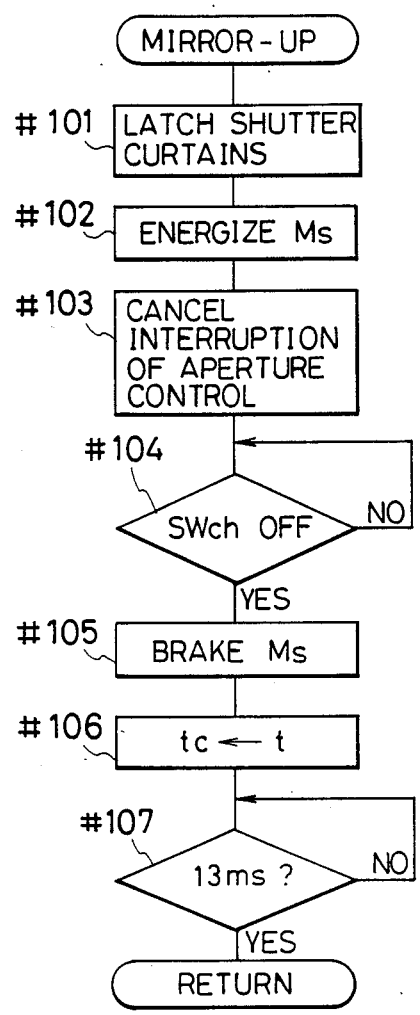
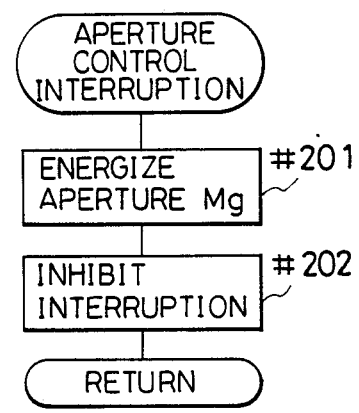

SINGLE-REFLEX CAMERA DRIVEN BY MOTOR

BACKGROUND OF THE INVENTION

1. Field of the Invention

The present invention relates to a motor-driven camera and, more particularly, to a motor-driven single-reflex camera of the type which utilizes a motor to carry out various photographic operations such as the operation of moving up and down a movable mirror and the operation of effecting shutter charging operation.

2. Related Background Art

In a single reflex camera of the TTL metering type in which its photometric system for automatic exposure adjustment (hereinafter referred to the "AE") and automatic focus adjustment (hereinafter referred to as the "AF") is arranged to receive light flux passed through a photographing lens and reflected from a movable mirror, in order to achieve accurate photometry, it is necessary to start photometry after mirror bounds due to the shock occurring when the movable mirror has descended calm down and the movable mirror has come to a rest accurately at a predetermined down position. In particular, in the case of continuous shooting, the above necessity is an essential consideration.

Accordingly, a conventional method of starting photometry utilizes a switching means which can be switched between the ON and OFF states when the movable mirror has moved to its down position. In this method, after it has been determined, through the switching means, that the movable mirror has completed its mirror-down operation, photometry is started after a predetermined estimated time period has passed which corresponds to the time period required for the mirror bounds to disappear. A simplified method has also been proposed in which, after the reception of the detection signal of a detecting means for detecting whether or not shutter running has been completed, photometry is started after a predetermined time period including a mirror-down period.

However, in the case of the former method of starting photometry when the predetermined time period has passed after the detection of the completion of the mirror-down operation, the switching means need to be added to a mirror driving mechanism in order to detect the time of the completion of the mirror-down operation. Accordingly, it has been impossible to avoid the problem that the mirror driving mechanism inevitably becomes complicated.

In the case of the latter method of starting photometry when the predetermined time period has passed after the detection of the completion of the shutter running operation, the following problems are encountered. More specifically, a conventional motor-driven type of cameras which are capable of film winding and shutter charging is arranged such that a movable mirror is moved up and down by the urging force of a spring which is charged during film winding. Accordingly, there is no risk that the time period required for the mirror-down operation is changed due to variations in the level of source voltage. However, many of built-in motor cameras which have recently been developed are arranged such that a movable mirror is also driven directly by a motor to move up and down. In such a case, the length of the time period required for the mirror-down operation varies in accordance with variations in the level of the source voltage.

Accordingly, in the latter method, in order that the wait time required from the completion of shutter running to the starting of photometry can be made constant even if the level of voltage supplied to the motor varies, the wait time is selected to be somewhat long so as to cope with a case where the level of the source voltage falls. Accordingly, although the mirror-down operation is completed in a short time when the level of the source voltage is high, it has been impossible to increase the film tranporting speed for continuous shooting since photometry cannot be started at an earlier time because of the presence of such wait time.

SUMMARY OF THE INVENTION

It is, therefore, a first object of the present invention to provide a motor-driven single-reflex camera of the TTL metering type which is capable of solving the problems of the above-described conventional motor-driven single-reflex cameras and of effecting high-speed continuous shooting.

It is a second object of the present invention to provide a motor-driven single-reflex camera of the TTL metering type which is capable of increasing the film transporting speed during continuous shooting by efficiently setting the timing of photometry in correspondence with variations in the level of load or the level of source voltage.

In order to achieve the above objects, in accordance with the present invention, there is provided a camera of the single-reflex type which has a mirror driving mechanism for moving up and down a movable mirror by means of a driving motor. This camera is provided with photometric means arranged to receive a light flux transmitted through a photographing lens and reflected from the movable mirror, stop-signal generating means for generating a signal which serves to stop the driving of the driving motor upon completion of the mirror-up operation executed by the mirror driving mechanism; first timer means for counting the mirror-up time required from the moment that the driving of the driving motor is started until the moment that the stop signal is generated; second timer means arranged to start counting in synchronization with the commencement of the driving of the driving motor for starting mirror-down operation and to generate a signal which serves to cause the photometric means to start when the time period equivalent to the time period which has been determined (for photometry) on the basis of the mirror-up time counted by the first timer means.

With the arrangement described above, when release operation is initiated, the time period required from the starting of the driving motor until the completion of the mirror-up operation is counted by the first timer means. When a time period has passed which is equivalent to the time period determined on the basis of the mirror-up time counted by the first timer means and required from the starting of mirror-down operation after the completion of shutter running until the starting of photometry, the second timer means outputs a photometry start signal, and photometry is initiated in response to the photometry start signal. Accordingly, since the minimum time margin suffices to cope with variations in the level of source voltage or the like, it is possible to extremely reduce the wait time of the mechanism and, therefore, to achieve efficient film winding. Accordingly, it is possible to increase film transporting speed readily and reasonably Further objects, features and advantages of the present invention will become apparent from the following detailed description of embodiments of the present invention with reference to the accompanying drawings.

BRIEF DESCRIPTION OF THE DRAWINGS

FIGS. 6A and 6B are flow charts showing the mirror-up routine used in the microcomputer shown in FIG. 1;

DESCRIPTION OF THE PREFERRED EMBODIMENT

An embodiment of the present invention will be described below in detail with reference to the accompanying drawings.

First of all, the function of a single-reflex camera according to an embodiment of the present invention will be described below. The camera to which the embodiment of the invention is applied is of the fully automatic type capable of automatic loading, winding and rewinding of photographic film. The speed of film transportation during continuous shooting can be set in three steps by selecting a desired one of the following shooting modes CH, CL and S by operation of a selection member (not shown). The CH mode is a high-speed shooting mode in which the speed of film transportation is 3 or more frames per second. The CL mode is a continuous shooting mode in which the speed of film transportation is on the order of 2 frames per second. The S mode is a single-exposure mode in which the shutter operates only once each time the release button is pressed.

This camera also has the function of automatically adjusting focus, and is arranged to detect focus through a focus detecting means and to drive the distance ring of the photographing lens barrel on the basis of the result of detention, thereby effecting adjustment of focus. Such an automatic focus adjusting function is arranged to operate in two AF modes: an AF-C mode and an AF-S mode. The AF-C mode is a release priority mode in which, when the release button is pressed, the shutter operates to effect exposure even in an out-of-focus state, and the AF-S mode is a focus priority mode in which, as long as the lens is out of focus, even if the release button is pressed, the shutter does not operate.

The timing of driving of each driving motor, which will be described later, is determined in accordance with which mode is selected from among the modes described above.

In the present embodiment, three motors are employed: the first motor is a motor Ms for sequence driving (hereinafter referred to as the "S motor"), the second motor is a motor Mf for transporting film (hereinafter referred to as the "F motor"), and the third motor is a motor Maf for automatic focus adjustment (hereinafter referred to as the "AF motor").

Figure 1:
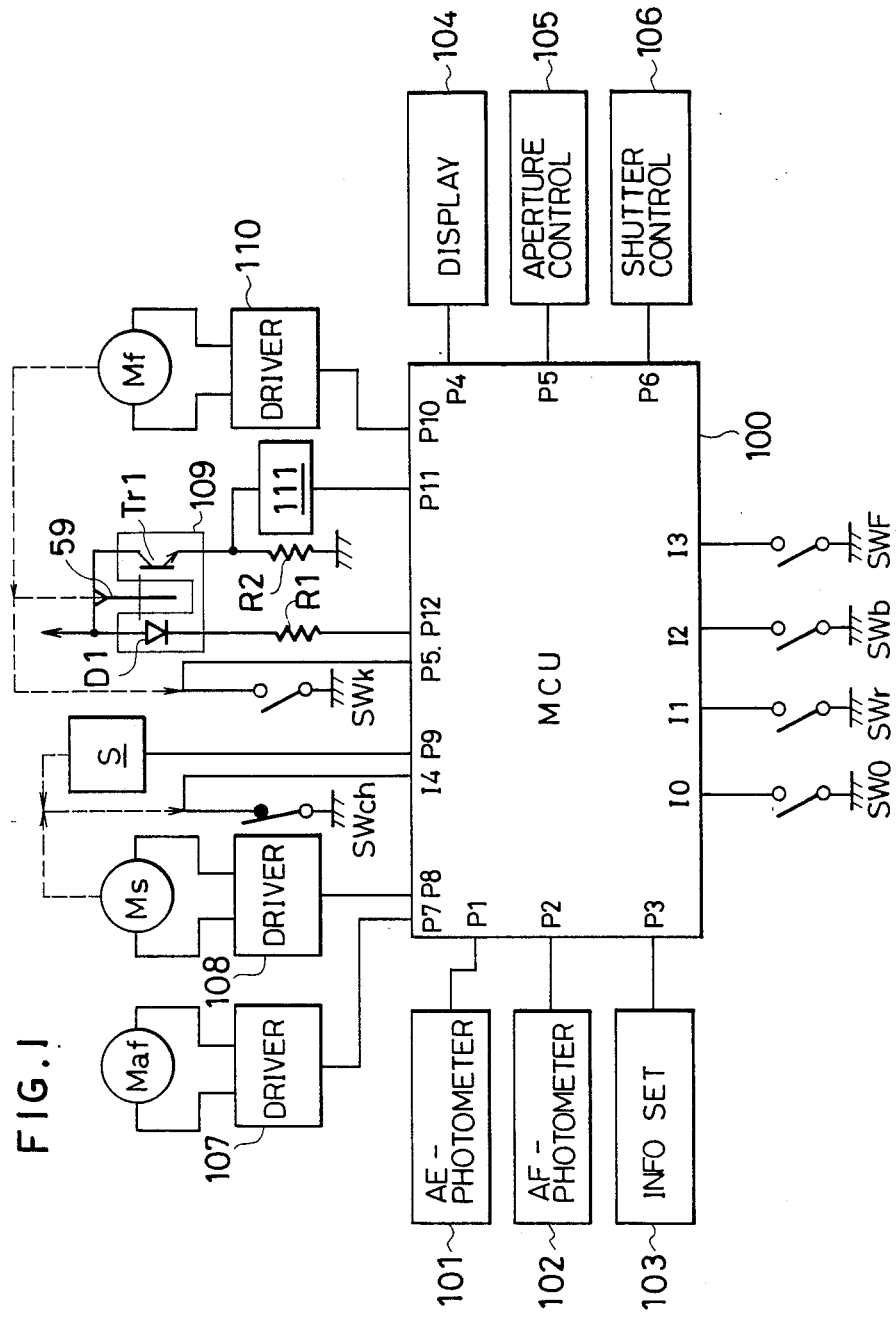
FIG. 1 is a block diagram schematically showing the construction of an embodiment of the present invention.

FIG. 1 is a block diagram which serves to illustrate the embodiment of the present invention. A microcomputer (hereinafter referred to as the "MCU") 100 is arranged to execute predetermined routines for various types of inputs, thereby realizing various functions. An AE-photometer circuit 101, an AFphotometer circuit 102, and an information setting circuit 103 are connected to the ports P1, P2 and P3 of MCU 100, respectively, and MCU 100 is arranged to receive information from these circuits 101, 102 and 103. Further, MCU 100 is arranged to provide, at a port P4, and AE display information output obtained by performing arithmetic operations based on the output from the AE-photometer circuit 101 and a display information output obtained by performing arithmetic operations based on the output from the information setting circuit 103. A display circuit 104 provides a predetermined display based on a signal provided at the port P4.

An aperture control circuit 105 includes an aperture control photointerruptor 134 for detecting the angle of rotation of a slit disk 34 (FIG. 3) which is arranged to rotate in accordance with the operation of stopping down the aperture of a photographing lens after the release button has been pressed when a programmed exposure control mode or a shutter-priority exposure control mode is selected. The aperture control circuit 105 is arranged to shape the waveform of the aperture control photointerruptor output from the photointerruptor 134 and then to transmit the aperture encoder pulse having the thus-shaped waveform to MCU 100 through a port P5. MCU 100 is arranged to measure the number of aperture encoder pulses and, when a predetermined number is reached, energize through the port P5 an aperture controlling combination magnet included in the aperture control circuit 105, thereby setting the aperture of the photographing lens to an aperture value which corresponds to a proper exposure value.

A shutter control circuit 106 is arranged to be controlled through the port P6 by MCU 100. In response to the shutter release operation, the shutter control circuit 106 energizes a magnet (hereinafter referred to as the "opening Mg"; not shown) provided for stopping the running of a shutter opening curtain and another magnet (hereinafter referred to as the "closing Mg"; not shown) provided for stopping the running of a shutter closing operation, then cancels the energization of the opening Mg after a mirror-up operation has been completed to allow the running of the shutter opening curtain to commence, and, when a predetermined period of shutter control time has passed, cancels the energization of the closing Mg to allow the running of the shutter closing curtain to start, thereby controlling the shutter speed.

A switch SW0 constitutes a release switch which is connected to the input terminal I0 of MCU 100 and which is arranged to be switched on when the release button has been pressed through a second stroke, beyond a first stroke at which the release button is halfway depressed. A switch SWr constitutes a rewind switch and a switch SWb constitutes a back cover switch which is switched on and off by the opening and closing operation of a back cover 70 of the camera. A switch SWF constitutes a switch used for detecting the presence or absence of photographic film. These switches SWO, SWr and SWF are connected to the input terminals 11, 12 and 13 of MCU 100, respectively.

An AF-motor driver circuit 107 is connected to a port P7, and is arranged to drive and control the AF motor Maf on the basis of the result obtained by MCU 100 by performing arithmetic operations on the output from the AF-photometer circuit 102.

An S motor driver circuit 108 is connected to the port P8 of MCU 100. A charge switch SWch is connected to the input terminal 14 of MCU 100, and a solenoid S is connected to the port P9 of MCU 100. After a shutter release operation has been executed, MCU 100 responds to the operation of the charge switch SWch to supply predetermined operation signals to the S-motor driver circuit 108 and the solenoid S through the ports P8 and P9, respectively, thereby effecting driving of the S motor Ms and the solenoid S. In this manner, MCU 100 carries out the starting of a shutter release sequence, mirror-up operation, mirror-down operation, and shutter-charging operation.

A driver circuit 110 for driving a film transporting motor is connected to the port P10 of MCU 100. After the shutter controlling operation has been completed, MCU 100 supplies an output to the port P10 to cause the driver circuit 110 to drive the F motor Mf, thereby transporting the photographic film by one frame. When the rewind switch SWr has been pressed, the F motor Mf is reversed to effect rewinding of the full length of photographic film. A switch SWk constitutes a reference switch which is connected to the input terminal 15 of MCU 100. A photointerruptor 109 responsible for film transportation includes a light emitting diode D1 and a phototransistor Tr1, and a slit disk 95 is arranged to rotate in the gap between the light emitting diode D1 and the phototransistor Tr1 in accordance with the transportation of the photographic film. The anode electrode of the light emitting diode D1 and the collector electrode of the phototransistor Tr1 are connected to an electrical power supply line (not shown), while the cathode electrode of the light emitting diode D1 is connected to the port P12 of MCU 100 through a resistor R1. The emitter electrode of the phototransistor Tr1 is connected to one terminal of a resistor R2 the other terminal of which is grounded.

After a shutter opening and closing operation or a shutter charging operation has been completed, MCU 100 causes the F motor Mf to run forward and, simultaneously, sets the level of a signal at the port P12 to its low level, thereby allowing an electrical current to flow in the light emitting diode D1 so that the light emitting diode D1 emits light. During the rotation of the slit disk 59, the light flux emitted from the light emitting diode D1 toward the phototransistor Tr1 is intermittently blocked owing to the presence of a multiplicity of slits formed in the slit disk 59 so that the state in which the light flux is blocked by the slit disc 59 and the state in which the light flux is transmitted through each slit occur alternately. In consequence, the intensity of light incident upon the base of the phototransistor Tr1 is varied whereby a voltage variation which corresponds to a variation in the intensity of light is brought about at a point at which the resistor R2 and a waveform shaping circuit 111 are connected to each other. The waveform shaping circuit 111 shapes the waveform of the voltage variation to output a pulse train, corresponding to the amount of photographic film transported (that is, the F encoder output), to MCU 100 through the port P11. MCU 100, in turn, measures the number of pulses input to the port P11 at a predetermined timing, causing the driver circuit 110 to drive the motor Mf for film transportation. In this fashion, film transportation control, which will be described later in more detail, is enabled.

As described above, the slit disc 59, the photointerruptor 109, the waveform shaping circuit 111, and the resistors R1 and R2 constitute a means for detecting the amount of photographic film tranported.

Figure 2:
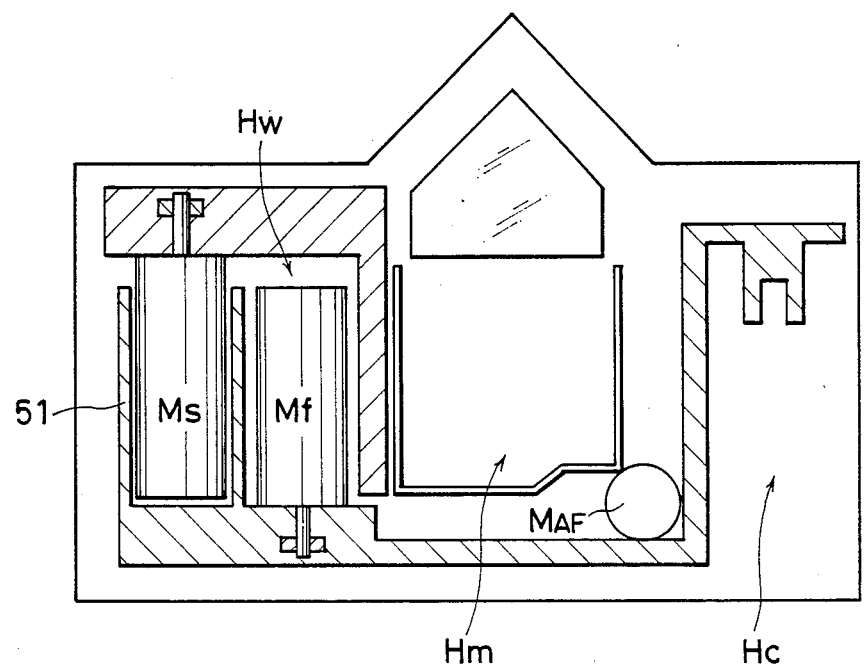
FIG. 2 is a schematic cross-sectional front elevational view of a camera according to the embodiment of FIG. 1, and shows the layout of driving motors in the embodiment of FIG. 1.

FIG. 2 is a schematic illustration showing the layout of each of the motors as viewed from the front of the camera.

Figure 3:
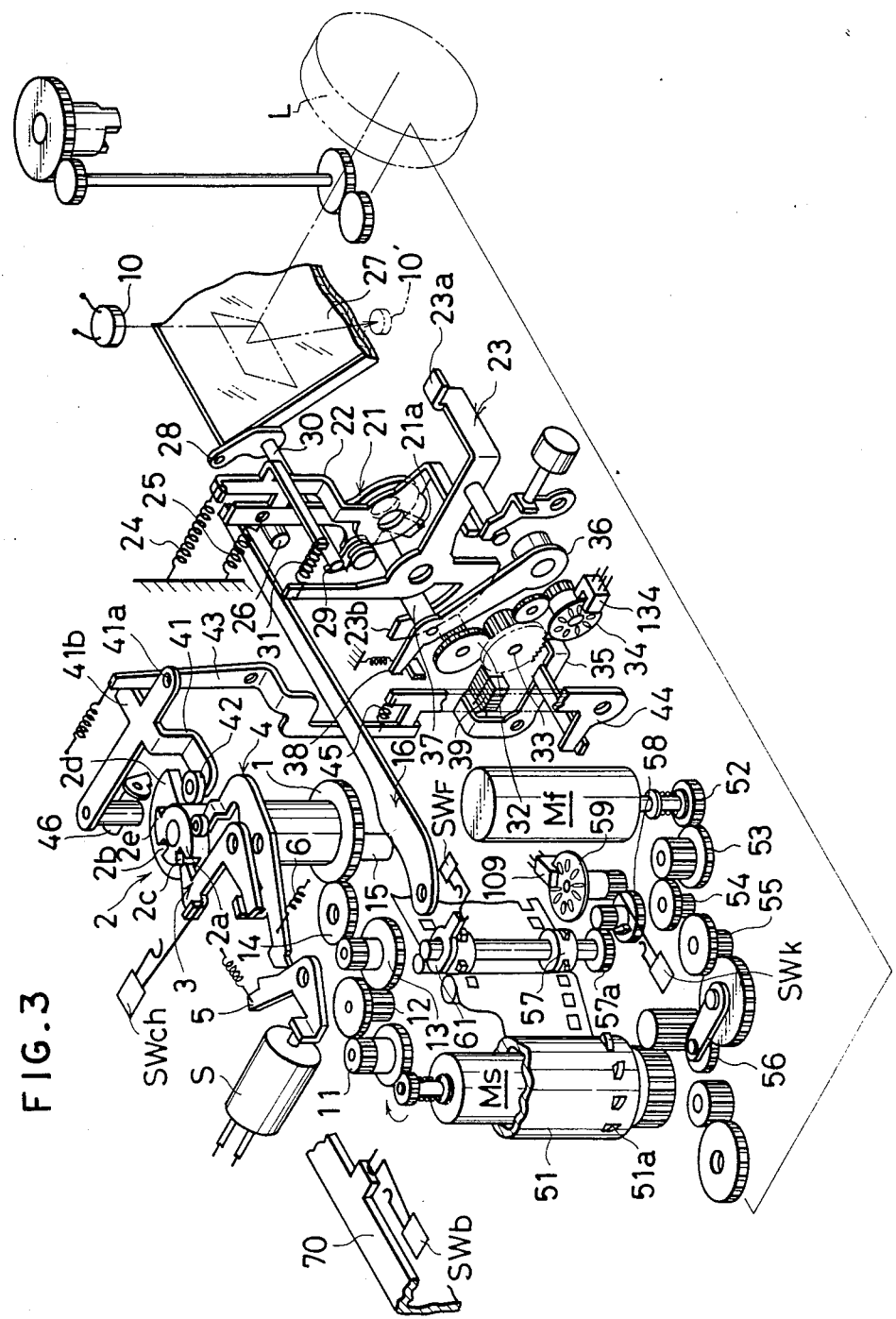
FIG. 3 is a diagrammatic perspective view showing the driving mechanism section of the camera according to the embodiment of FIG. 1.

The S motor Ms for sequence driving is provided in a winding spool 51 (see FIG. 3). A sequence mechanism which is driven by the S motor Ms to execute the mirror moving operation, aperture adjusting operation, and shutter charging operation is incorporated as one unit into an upper portion of the camera body on the side where photographic film is wound and a portion adjacent to a corresponding side of a mirror box Hm. The output shaft of the S motor Ms is located at an upper portion of the camera body as viewed in FIG. 2, and is arranged to rotate in one direction only.

The F motor Mf for photographic film transportation is disposed at an intermediate location between the mirror box Hm and a winding-spool compartment Hw in the camera body. When the F motor Mf runs forward, the photographic film is wound, while, when the F motor Mf runs backward, the photographic film is rewound. The switching between the winding transmission system and the rewinding transmission system is performed by means of a clutch assembly including a planetary gear wheel 56 (FIG. 3) whose axis describes a circular path around the axis of a meshed gear wheel while the gear 56 is rotating forward or backward, as will be described later.

The AF motor Maf is provided at a location below the bottom of the mirror box Hm and adjacent to a chamber Hc which accommodates a film cartridge. The rotation of the output shaft of the AF motor Maf is transmitted to the photographing lens through a coupling (not shown) provided on the lower portion of a bayonet mount (not shown) which is nearer to the winding-spool compartment Hw, the bayonet mount being provided for attachment of the photographing lens.

FIG. 3 is a perspective view of the essential portion of a driving section according to the embodiment of the present invention, and shows the state of the driving section before a release operation is started. With reference to FIG. 3, the driving mechanism used in the embodiment of the present invention will be described below.

First of all, the sequence system of the driving mechanism shown in FIG. 3 will be described. One operation of the S motor Ms is divided into two period; the first period lasts from the beginning of the mirror-up operation to the end of the aperture driving operation, and the second period lasts from the beginning of the mirror-down operation to the end of the shutter charging operation. In the first period (from the beginning of the mirror-up operation to the end of the aperture driving operation), a charge cam 2 formed integrally with a charge cam gear 1 is rotated through 85° from its angular position of 0° and, in the second period (from the beginning of the mirror-down operation to the end of the shutter charging operation), the charge cam 2 is rotated through the remaining 275° to a rotational reference position (or start position). In this manner, one rotation of the charge cam 2 completes one sequence.

The following is a description of the operation of a charge cam portion including the charge cam 2. As illustrated in FIG. 3, an engagement lever 3, engaged with a disengagement lever 4, is kept at its counterclockwise rotational position where the engagement lever 3 is disengaged from a charge cam recess 2c, while the charge cam 2 is in a rotatable state. In this state, the charge switch SWch is off, and has a movable contact element for urging the engagement lever 3 in the clockwise direction. When a release button 7 is pressed to a full stroke and the release switch SWO provides a corresponding release signal, the S motor Ms is started so that the charge cam 2 starts a counterclockwise rotation corresponding to the operation of the first period. A cam portion 2a is formed on the top of the charge cam 2, and the counterclockwise rotation of the charge cam 2 causes the disengagement lever 4 in contact with the cam portion 2a to rotate in the clockwise direction against the urging force of a spring 6, thereby engaging an engagement claw 5 with one end of the disengagement lever 4. When the disengagement lever 4 is rotated in the clockwise rotation, the engagement lever 3 becomes able to rotate in the clockwise direction. A cam recess 2b is provided on the top of the charge cam 2 to serve as an engagement recess for the operation of the first period, and the engagement lever 3 drops into the cam recess 2b and functions as a stopper for inhibiting the rotation of the charge cam 2. In association with the above operation of the disengagement lever 4, the charge switch SWch is switched on to stop the driving of the S motor Ms. The disengagement of the S motor Ms is carried out through the energization of the solenoid S. When the solenoid S is energized, the engagement claw 5 is caused to rotate in the counterclockwise direction against the urging force of a corresponding spring to disengage from the disengagement lever 4. Although the disengagement lever 4 is caused to rotate in the counterclockwise direction by the urging force of a spring 6, the disengagement lever 4 is caused to rotate in the counterclockwise direction together with the engagement lever 3 to disengage the engagement lever 3 from the charge cam 2 since the urging force of the switch SWch for urging the engagement lever is selected to be stronger than the urging force of the movable contact element of the switch SWch.

Subsequently, after the running of the shutter closing curtain has been completed, the S motor Ms starts the operation of the second period which includes the operations required from the beginning of the mirror-down operation to the end of the shutter-charging operation. As in the operation of the first period, the disengagement lever 4 in the second period is caused to rotate in the clockwise direction by the movement of the cam portion 2e provided on the top of the charge cam 2, engaging with the engagement claw 5. When the charge cam 2 is rotated through 275° to the rotational reference position during the second period, the engagement lever 3 drops into a recess 2c provided on the top of the charge cam 2. Simultaneously, the S motor Ms is stopped by switching on the charge switch SWch and, after a short brake is continuously applied for a certain period of time, the solenoid S is energized to move the engagement lever 3 out of the charge cam recess Sc, thereby disengaging the engagement lever 3 from the charge cam 2. The disengagement of the engagement lever 3 from the charge cam 2 is executed at the time that the operation of the S motor Ms is completed, and the charge cam 2 is necessarily held in a stand-by state, waiting for the next cycle of operation The following is a description of the mirror-up and aperture driving operations executed in the first period.

When the release button 7 is pressed to a full stroke and the release switch SWO provides a corresponding release signal, the S motor Ms is driven in the clockwise direction. The clockwise rotation thus obtained is transmitted to the charge cam gear 1 through a transmission mechanism made up of speed reduction gears 11 to 14, and the charge cam 2 is caused to rotate in the counterclockwise direction. A mirror driving pin 15 is fixed to the lower end of the charge cam gear 1 at a position eccentric with respect to the axis thereof so that the mirror driving pin 15 abuts against the mirror driving lever 16 to displace the lever 16 in the clockwise direction. One end of the lever 16 is rotatably supported on a base (not shown), while the other end is engaged with a vertical lever 21 which is provided on the base (not shown) for driving a movable mirror (to be descried later). As the charge cam 2 rotates in the counterclockwise direction, the lever 16 causes the lever 21 to rotate in the clockwise direction.

The vertical lever 21 for driving the mirror, an aperture-restoring lever 22, and an aperture-driving lever 23 are supported for pivotal motion about a common axis. The vertical lever 21 and the aperture restoring lever 22 are urged in the counterclockwise direction by respective springs 25 and 24 to force one edge of the vertical lever 21 against an initial-position setting pin 26. When a movable mirror 27 is located at its initial position (prior to the release operation), the movable mirror 27 is inclined downwardly at approximately 45° with respect to the photographing optical path ahead of the film plane. Accordingly, the movable mirror 27 reflects the light flux transmitted through a photographing lens L in the upward direction to conduct the light flux to a photosensor 10 which constitutes part of a photometer device, and the portion of the light flux which has passed through the movable mirror 27 is reflected downwardly by a sub-mirror provided to the rear of this mirror 27 to be conducted to a photosensor 10'. The movable mirror 27 is supported for swinging motion about a pivot axis 28 and is urged in the clockwise direction by means of a mirror-down spring (not shown). A mirror driving pin 30 is provided on a side surface of the movable mirror 27 in such a manner as to project therefrom in the horizontal direction. The mirror driving pin 30 extends into the working orbit of a lever 29 which is provided at one end of the vertical lever 21 for driving the movable mirror 27. As the operation of the first period proceeds, the mirror driving lever 21 is pressed by the mirror driving lever 16 to cause the mirror driving vertical lever 21 to rotate in the clockwise direction. This clockwise rotation pushes up the mirror driving pin 30 to cause the movable mirror 27 to rotate in the counterclockwise direction, that is, in the upward direction.

In the meantime, the aperture restoring lever is also pressed by the mirror driving lever 16 to rotate in the clockwise direction together with the mirror driving vertical lever 21. The aperture restoring lever 22 and the aperture-driving lever 23 are connected by an aperture driving spring 31, and the aperture-driving lever 23 is also caused to rotate in the clockwise direction by virtue of the spring 31. An aperture lever (not shown) provided in the lens barrel (not shown) of the photographing lens L abuts against an end 23a of the aperture-driving lever 23 so that, as the aperture-driving lever 23 provided in the camera body rotates in the clockwise direction, the aperture of the photographing lens L is stopped down. A gear portion, which is provided around an outer periphery of another arcuate end 23b, is meshed with an speed increasing gear 32 which is, in turn, meshed with an aperture controlling latchet wheel 33. The aperture controlling slit disk 34 is in meshed relation with the aperture controlling latchet wheel 33. In response to an encoder output corresponding to a set aperture value, the aperture controlling latchet wheel 33 is engaged so that aperture control is provided. The aperture control engagement claw 35 is set to its magnetically attracted position at which it is magnetically held on the permanent magnet of an aperture controlling combination magnet (hereinafter referred to as the "aperture Mg") 39. When the number pa of pulses corresponding to the set aperture value has been output from the photointerruptor 134, the aperture Mg 39 is energized to cancel the magnetic attraction of the aperture control engagement claw 35. Accordingly the engagement claw 35 is allowed to rotate in the counterclockwise direction, engaging wit the latchet wheel 33, whereby the aperture-driving lever 23 is engaged at the desired setting.

A cam portion 21a is formed at an extending end of the mirror driving vertical lever 21, and a roller 37, which is provided at one end of a shutter release lever 36, is arranged to abut against the cam portion 21a. As the movable mirror 27 moves upward, the shutter release lever 36 is caused to rotate in the counterclockwise direction by the movement of the cam 21a, whereby an engagement lever 38 associated with the shutter (not shown) engaged with the extending end of the lever 36 is caused to disengage therefrom.

The following is a description of the operation of the second period from the beginning of the mirror-down operation to the end of the shutter-charging operation.

After shutter control operation has been completed, the solenoid S is energized to cause the engagement lever 3 to rotate in the counterclockwise direction, thereby disengaging the charge cam 2. When the inversion of the state of the charge switch SWch (on→off) is detected, the S motor Ms starts to run in the same direction as the direction of running in the first period, that is, in the clockwise direction. As the charge cam 2 rotates, the mirror driving lever 16 is caused to rotate in the counterclockwise direction by the urging force of the spring 25 which urges the mirror driving vertical lever 21. The movable mirror 27 moves downward in accordance with the counterclockwise rotation of the mirror driving lever 16.

A roller 42 fixed to a shutter charge lever 41 is arranged to abut against a cam portion 2d of the charge cam 2. The shutter charge lever 41 is rotatably supported at 41a on the base (not shown) and a roller 42 is provided at one end of the shutter charge lever 41. This roller 42 is engaged with a charge lever 46 associated with the shutter (not shown). As the charge cam 2 is caused to rotate in the counterclockwise direction in the second period, the shutter charge lever 41 is caused to rotate in the clockwise direction, thereby causing the charge lever 46 associated with the shutter to rotate in the clockwise direction so that the charging of a shutter driving spring (not shown) is effected. One extension 41b of the shutter charge lever 41 is engaged with a reset connecting lever 43 and, as the shutter charge lever 41 rotates in the clockwise direction, the rest connecting lever 43 is caused to rotate in the clockwise direction. The reset connecting lever 43 and a reset lever 44 are connected by a reset spring 5 so that these levers 43 and 44 are urged to come into contact with each other. The urging force of the reset spring 45 causes the engagement lever 35 which is engaged with the reset lever 44 and which is magnetically attracted by the aperture Mg 39 to rotate in the clockwise direction, moving in the counterclockwise direction. Thus, the engagement lever 35 is reset to its magnetically attracted position. Accordingly, the latchet wheel 33 is disengaged from the engagement lever 35 so that the aperture-driving lever 23 is disengaged and caused to rotate in the counterclockwise direction by the urging force of the spring 24 until the aperture in the photographing lens is restored to its fully open position. When the charge cam 2 passes through the rotation of 275° corresponding to the second period to complete the mirror-down operation and the shutter-charging operation, the charge cam 2 is again stopped at the rotational reference position, whereby one sequence is completed.

Next, the film transporting system will be described later. In the embodiment of the present invention, its film winding system utilizes a spool driving system in which photographic film is wound around the winding spool 51 with the perforations of the photographic film being hooked at claws 51a provided on the outer periphery of the winding spool 51.

The F motor Mf for film transportation is attached to the base (not shown) fixed in the camera body. A pinion gear 52 is provided on the output shaft of the F motor Mf so that the rotation of the output shaft is transmitted to the winding spool 51 through a train of speed reduction gears 53, 54 and 55. A planetary gear 56 is provided at an intermediate position in this gear transmission mechanism so that the rotation of the output shaft is transmitted to the winding spool 51 while the output shaft of the F motor Mf is being rotated in the clockwise direction and so that, while the output shaft of the F motor Mf is being rotated in the counterclockwise direction, the rotation of the output shaft is transmitted to a rewinding gear 60. A sprocket 57 having four sprocket teeth serves as a follower for detecting the amount of movement of the perforation of photographic film. A gear 57a is provided on the lower portion of the sprocket 57 so that the rotation of the sprocket 75 is transmitted to the slit disk 59 through a reference gear 58. The reference gear 58 is arranged to make one rotation each time one frame is transported. A reference switch SWk is disposed in contact with the outer periphery of the reference gear 58 so as to output one pulse each time the reference gear 58 makes one rotation. The slit disk 59 has a resolution which causes one hundred fourteen pulses to be generated with respect to one frame. When a predetermined number of encoder pulses are detected through the detection of the signal output from the reference switch SWk, the transportation of photographic film is stopped, whereby the position of each frame of the photographic film can be accurately controlled.

The speed of film transportation seriously varies in accordance with whether high-speed winding or low-speed winding is selected and, in addition, due to various other factors such as variations in the level of source voltage, variations in ambient temperature, and so forth. Accordingly, it is very difficult to always stop photographic film after it has been transported by a constant amount. In the present embodiment, in order to cope with such variations in film transporting speed, the film transporting speed is monitored so that the control timing of braking immediately before the stoppage of the film is varied in accordance with the monitored $ speed. In this way, the mechanism is controlled so that the amount of overrunning can always be made constant with respect to a desired stop position.

The reference switch SWk is a switch which is switched off when photographic film is transported by a half frame (by a length corresponding to 18 mm in the case of a 35-mm film). The reference switch SWk functions as a transportation reference switch for positioning the gaps between adjacent photographic frames in the gaps between adjacent holes in the perforations. The transportation of photographic film is braked in a controlled manner so that the transportation is stopped when fifty seven pulses (for a half frame) have been counted in the off signals of the reference switch SWk. The monitoring of film transportation speed is achieved by counting the time required from the moment that the reference switch SWk is switched on to the moment that photographic film is transported by a predetermined length, and the duty drive range is varied with reference to the thus-obtained monitor value. As the speed is made higher, the brake can be made to act over a longer range, while, as the speed is made slower, the brake can be made to act over a shorter range.

Figure 4:
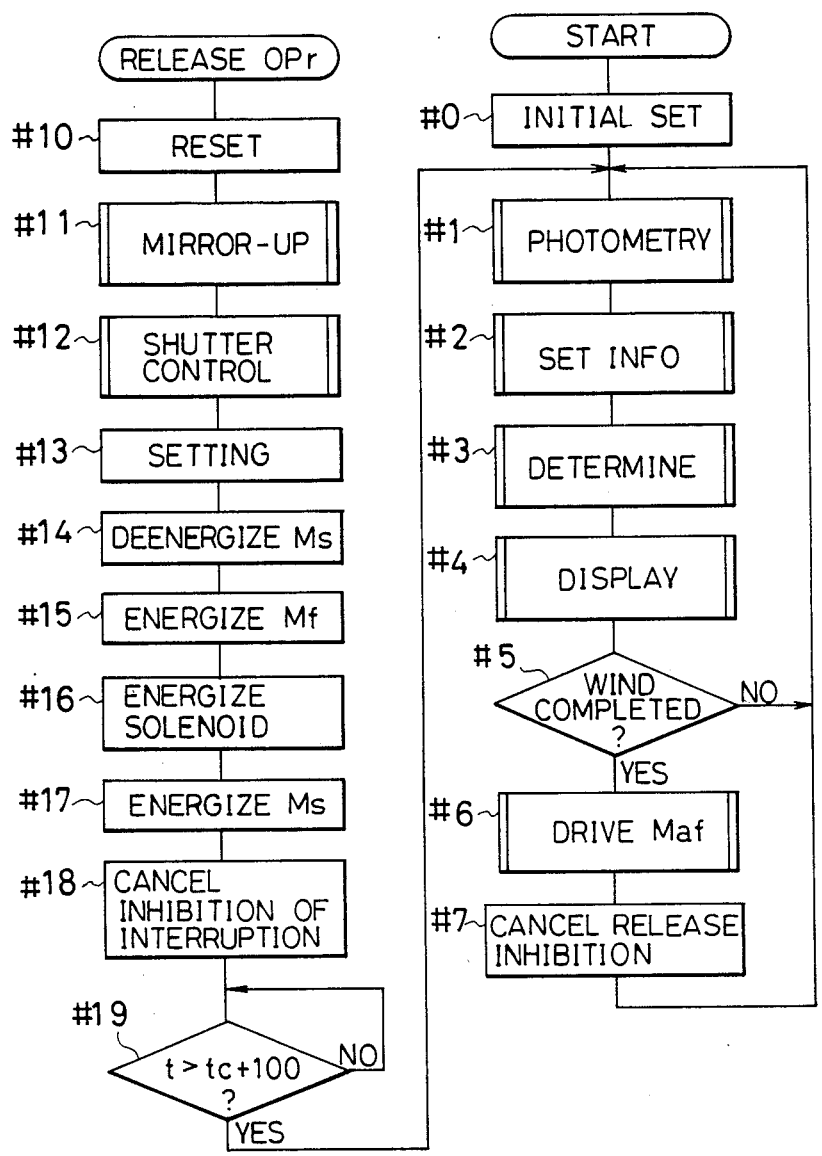
FIG. 4 is a flow chart showing the main routine of the microcomputer shown in FIG. 1.

The operation of the above embodiment will be explained below with reference to the flow charts of FIGS. 4 to 7 and the timing chart of FIG. 8. FIG. 4 is a flow chart which serves to illustrate the main routine of MCU 100 shown in FIG. 1. In the flow chart of FIG. 4, when electrical power is supplied to MCU 100, the operation of MCU 100 is started with a predetermined address. In Step #0, elements such as memory, timers and flags are initialized. In Step #1, a photometric routine is called to obtain the A/D converted value of the AE- and AF-photometric outputs from the AE-photometer circuit 101 and the AF-photometer circuit 102, respectively. Then, in Step #2, and information setting routine is called, and information representing each mode, film sensitivity information, shutter speed information, and lens aperture information are read from the information setting circuit 103. In Step #3, an arithmetic routine is called, and the apex operations required to obtain a desired exposure value and the arithmetic operations required for the AF driving of the photographing lens are performed on the basis of the information obtained in Steps #1 and #2. In Step #4, a display routine is called, and the display circuit 104 is driven so as to display AE and AF information on the basis of the results thus obtained.

In Step #5, it is checked whether or not film winding has been completed. If film winding has not yet been completed, the process returns to Step #1, while if film winding has been completed, the process proceeds to Step #6, where the AF motor Maf is driven in accordance with the results of the arithmetic operations for AF driving obtained in Step #3. In Step #7, release inhibition is cancelled. At this time, when the release switch SWO is switched on, a release sequence which will be described later can be started. If no interruption takes place, the process returns from Step #7 to Step #1, and the process of Steps #1 to #3 is repeated.

Figure 5:
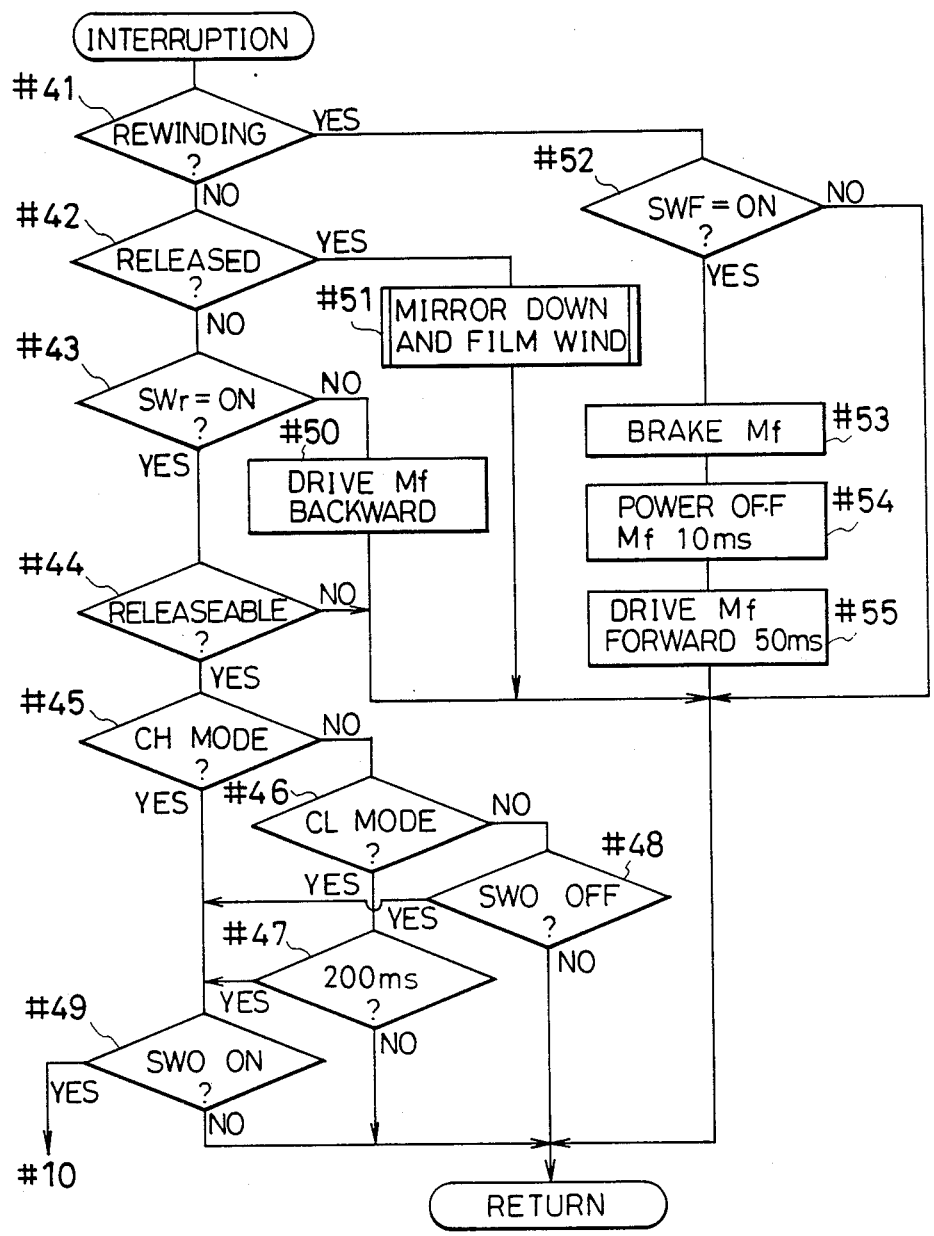
FIG. 5 is a flow chart showing the timer interruption routine used in the microcomputer shown in FIG. 1.

On the other hand, when the release switch SWO is switched on and the process enters the release sequence, the process jumps from Step #49 in the interruption routine of FIG. 5 to Step #10 of FIG. 4. In Step #10, a tack pointer is reset to alter the states of elements such as a timer and flags into settings corresponding to the states after release. In Step #11, the mirror-up routine shown in FIG. 6A is called so as to provide the control required to execute the process including sequence start-up, aperture control, and the completion of the mirror-up operation.

Subsequently, in Step #12, a shutter control routine is called to control the shutter speed to conform with a predetermined shutter speed. Then, in Step #13, resetting of the timer and flags required to start the mirror-down operation is effected. In Step #14, when the energization of the S motor Ms is cancelled, the braked state is cancelled. In Step #15, when the F motor Mf for film transportation is energized, winding of the photographic film is started. If the state in which no photographic film is located on a film transportation path is detected through the switch SWF for detecting the presence or absence of the photographic film, the F motor Mf is of course not driven. In Step #16, the solenoid S is energized (t=t6 in FIG. 8) and the process waits for the charge switch SWch to be switched off. When the solenoid S is energized to cancel the engagement of the disengagement lever 4, the charge switch SWch is switched off (t=t7 in FIG. 8). At this time, the energization of the solenoid S is cancelled and the process proceeds to Step #17.

In Step #17, when the S motor Ms is energized, the control for the operation of the second period is started. In Step #18, inhibition of interruption is cancelled, whereby it becomes possible to execute the timer interruption routine of FIG. 5. The process of the main routine further proceeds to Step #19, and waits for the passage of the time tc required to complete the mirror-up operation plus a predetermined period of time (for example, 100 ms). That is to say, if tc+100 ms is not reached, the same process is repeated and, when tc 100 ms is exceeded, the process proceeds to Step #1. During this time, the mirror-down operation add the film winding operation are executed in parallel in the interruption routine. Further, when the estimated time period required for the mirror-down operation has passed, the process proceeds from Step #19 to Step #1, where the control required for the next frame which begins with re-photometry after the mirror-down operation is started.

FIG. 5 is a flow chart of the interruption routine of MCU 100. In this interruption routine, even while the main routine of FIG. 4 is being executed, interruption is brough about at predetermined time intervals (for example, 2 ms) so as to execute predetermined processing.

In Step #41, it is checked whether or not film rewinding is being performed. If film rewinding is being performed, the process proceeds to Step #52, while, if it is not being performed, the process proceeds to Step #42. In Step #42, it is checked whether or not the shutter has been released, and if the shutter has been released, the process proceeds to Step #51. If the shutter has not been released, the process proceeds to Step #43. In Step 43, it is checked whether or not the rewind switch SWr is switched on and, if the rewind switch SWr has been switched on, the process proceeds to Step #50. If the rewind switch SWr has not been switched on, the process proceeds to Step #44. In Step #44, it is checked whether or not the release operation is enabled. If the release operation is inhibited, the process proceeds to Step #45. If the release operation remains inhibited, the process returns so as to resume the process which was executed immediately before the interruption.

Accordingly, the process proceeds to Step #45 after release inhibition is cancelled in Step #7. In Step #45, it is checked whether or not the film transportation mode is set to the CH mode corresponding to the film transporting speeds of three or more frames per second. If the CH mode is selected, the process proceeds to Step #45. If the CH mode is not selected, that is to say, if the CL or S mode is selected, the process proceeds to Step #46. In Step #46, it is checked whether or not the film transportation mode is set to the CL mode corresponding to the film transporting speeds of about two frames per second. If the CL mode is selected, the process proceeds to Step #47. If the CL mode is not selected, that is to say, if the S mode is selected, the process proceeds to Step #48. Accordingly, only when the S mode is selected, the process proceeds to Step #48. In Step #48, it is checked whether or not the release switch SWO has been switched off. If the release switch SWO has been switched off, the process proceeds to Step #49. If the release switch SWO remains on, the process returns so as to resume the process which was executed immediately before the interruption, since the S mode is a mode which is adapted to negate the restarting of the release sequence when the release switch SWO remains pressed. When the CL mode is selected, the process proceeds from Step #46 to Step #47, where it is checked whether or not a predetermined period of 200 ms has been completed.

If 200 ms has passed, the process proceeds to Step #49. If 200 ms has not yet been reached, the process returns so as to resume the processing which was executed immediately before the interruption, since the CL mode is a mode which requires a certain period of time for effecting AF driving after the shutter has been released. Accordingly, in each of the film transportation modes, only when the release operation is enabled, the process proceeds to Step #49. In Step #49, it is checked whether or not the release switch SWO has been switched on. If the release switch SWO has been switched on, the process jumps to Step #10 in the main routine of FIG. 4. If the release switch SWO has been switched off, the process returns so as to resume the processing which was executed before the interruption.

Figure 7:
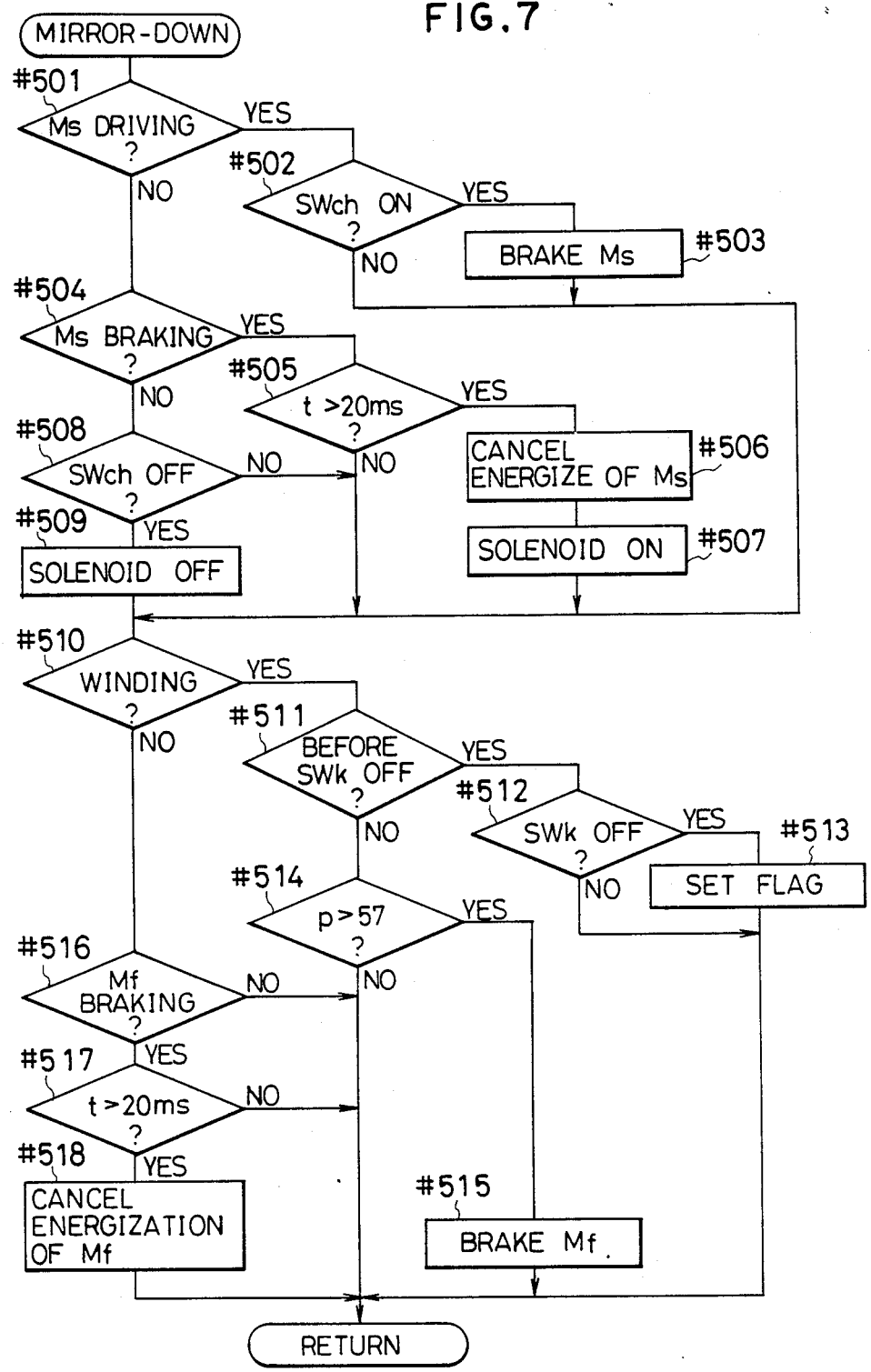
FIG. 7 is a flow chart showing the mirror-down/film winding routine used in the microcomputer shown in FIG. 1.

The interruption explained in connection with FIG. 5 is not executed until the required shutter control is completed after the shutter has been released. However, when interruption is again enabled in the mirror-down process, the process proceeds from Step #41 through Step #42 to Step #51. In Step #51, the mirror-down-/film winding routine shown in FIG. 7 is called. In the mirror-down/film winding routine, the process of each step of the film winding process is executed in a short time, and the process then returns so as to resume the processing which was selected immediately after the interruption.

On the other hand, when it is determined in Step #43 that the rewind switch is on, the process proceeds to Step #50. In Step #50, a voltage is applied to the F motor Mf in the direction reverse to the direction in which a voltage is applied in the case of film winding, thereby switching and operating the film transportation system. When the reversing of the F motor Mf is started, the process returns so as to resume the processing which was selected immediately before the interruption. Subsequently, if the next interruption occurs, the process proceeds from Step #41 to Step #52. In Step #52, it is checked whether or not the switch SWf for detecting the presence or absence of photographic film is on. If the switch SWf is on, the process proceeds to Step #53, while if the switch SWf remains off, the process returns so as to resume the processing which was selected immediately before the interruption.

When photographic film is present on the sprocket 57, the switch SWf for detecting the presence or absence of photographic film is switched on as the result of the displacement of a detection lever 61 pressed by the photographic film, while when the photographic film is disengaged from the sprocket 57, the switch SWf is switched off. Accordingly, if the switch SWf remains off, the process returns so as to continue the film winding operation. Subsequently, when the photographic film is disengaged from the sprocket 57, the switch SWf for detecting the presence or absence of photographic film is switched on and the process proceeds from Step #52 to Step #53. In Step #53, a short is caused across the F motor Mf so as to apply a brake. In Step #54, the energization of the F motor Mf is cancelled only for 10 ms. Then, in Step #55, the F motor Mf is driven forward only for 50 ms. This forward driving of the F motor Mf is performed in order to make the state of the spool free by switching the film transporting system so as to facilitate the loading of a new photographic film. When the process returns from Step #55, the processing which was selected immediately before the interruption is resumed. However, since the rewinding processing has been completed when the process again enters the interruption routine, the process does not proceed from Step #41 to Step #52.

Figure 8:
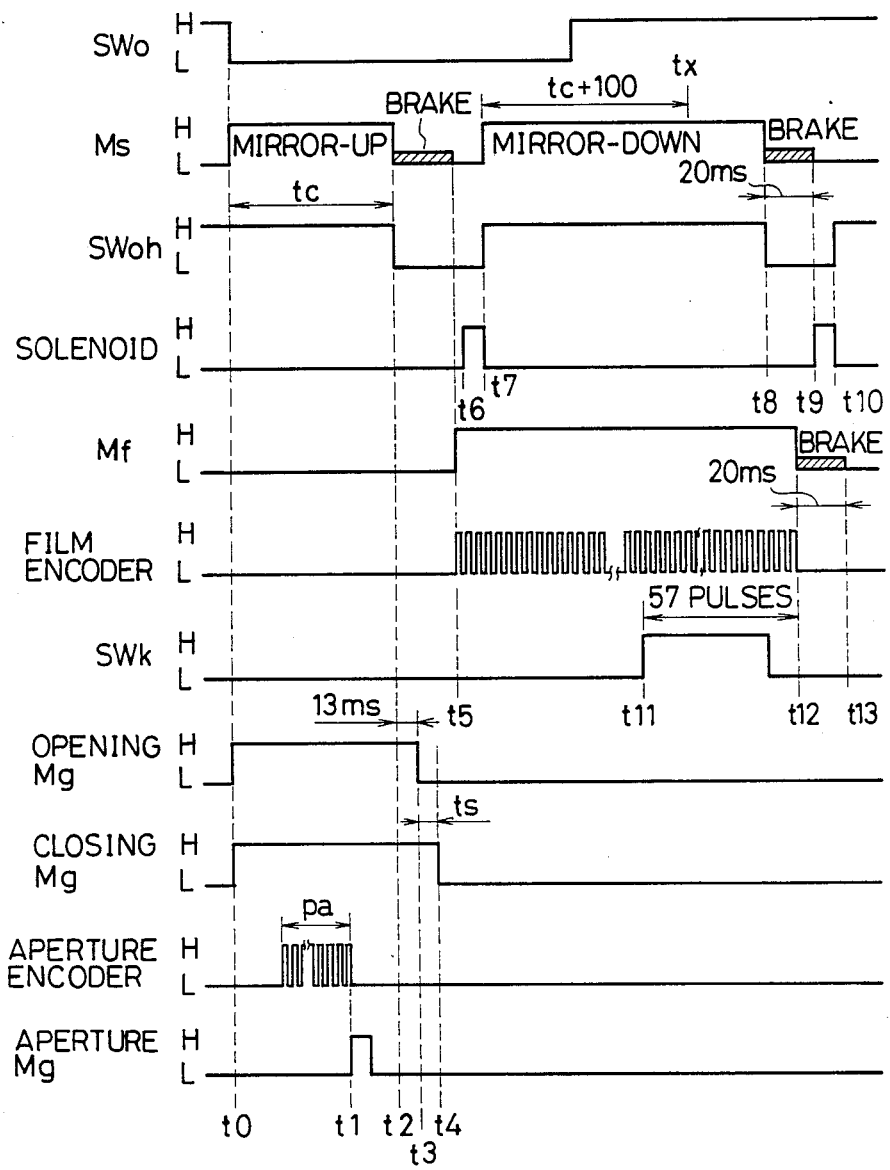
FIG. 8 is a timing chart showing the sequence after shutter release operation.

FIGS. 6A and 6B are flow charts which serve to illustrate the mirror-up routine of MCU 100, FIG. 7 is a flow chart of the mirror-down/film winding routine of MCU 100, and FIG. 8 is a timing chart which serves to illustrate the sequence executed after the shutter has been released. The flow shown in FIG. 8 will be explained with reference to the flow charts of FIGS. 4 to 7.

When electrical power is supplied to MCU 100, the process starts with the Step #0 of FIG. 4 for initializing the settings, and the process of Steps #1 to #4 is executed. In Step #4, information based on the results of the arithmetic operations performed in Step #3 is displayed. In Step #5, it is checked whether or not film winding has been completed. Since film winding is normally completed immediately after electrical power has been supplied to MCU 100, the AF motor Maf is driven in Step #6 and, in Step #7, release inhibition is cancelled and the process of Steps #1 to #7 is repeated.

During this time, interruption occurs at predetermined time intervals, and the process shown in FIG. 5 is executed. However, since neither rewinding nor release sequence is started, the process proceeds while executing Step #41, Step #42, Step #43, and Step #44 in that order. If release inhibition is cancelled in Step #7, the process proceeds from Step #44 to Step #45. The respective conditions of Steps #45 to #48 are the release inhibition conditions required for exposure of the next frame after the release operation has been completed in the individual film transportation modes. The process first proceeds to Step #49, in which the state of the release switch SWO is checked. If it is determined that the release switch SWO is on, the process jumps to Step #10 in the flow of FIG. 4. Thus, the release sequence is started (t=t0 in FIG. 8).

In Step #10, elements such as flags and timers to be switched immediately after the release operation are reset. In Step #11, the mirror-up routine shown in FIG. 6A is called so as to provide the control required to execute the process including sequence start-up, aperture control, and the completion of the mirror-up operation.

First, in Step #101 of FIG. 6A, the opening Mg and the closing Mg are energized to effect engagement of the corresponding shutter curtains and, then, in Step #102, the S motor Ms is energized. Thus, the mirror-up operation is started, and the stop-down operation of the photographing lens is also started. In Step #103, the interruption of an event counter which enables aperture control is cancelled. In Step #104, the process waits for the charge switch SWch to be switched off. The gear transmission mechanism has a certain amount of play. Accordingly, when a certain period of time has passed after the S motor Mg is energized, as the photographing lens is stopped down, aperture encoder pulses corresponding to the pulses output from a photointerruptor 134 are input.

The interruption of the event count for aperture control is executed as shown in FIG. 6B. In Step #3, the number pa of aperture encoder pulses is obtained which corresponds to a desired aperture value, and the number pa of aperture encoder pulses is set in the event counter. When the number of pulses corresponding to the number pa set in the event counter is counted (t=t1 in FIG. 8), the interruption shown in FIG. 6B occurs. In Step #201, when the aperture Mg 39 is energized, the aperture of the photographing lens can be changed into the aperture value obtained by arithmetic operations. In Step #202, the interruption of the event counter is inhibited.

In Step #104, when the charge switch SWch i switched off (t=t2 in FIG. 8), the process proceeds from Step #104 to Step #105. In Step #105, the brake is applied by causing a short across the S motor Ms. In Step #106, the time tc from the beginning of energization of the S motor Ms to the stoppage thereof is stored. Although the time tc is short if the capacity of a battery is sufficient, as the capacity of the battery becomes smaller, the time TC becomes longer. Subsequently, in Step #107, the process loops for 13 ms to wait for the shutter control system to stabilize. Then, the process returns from the mirror-up routine of FIG. 6A and proceeds from Step #11 to Step #12 of FIG. 4.

In Step #12, the shutter control routine is called and, when the deenergization of the opening Mg is effected, the shutter opening curtain starts to run. When the closing Mg is deenergized (t=t3 in FIG. 8) after a predetermined period of shutter-open time has passed, the running of the shutter closing curtain is started.

When the process proceeds from Step #12 to Step #13, the resetting of the elements, such as timers and flags, required to start the mirror-down operation is executed. In Step #14, when the S motor Ms is deenergized, the braked state is cancelled. In Step #15, when the F motor Mf is energized, the winding of the photographic film is started. In Step #16, when the solenoid S is energized and the charge switch SWch changes from an on state to an off state, this energization is cancelled. Subsequently, in Step #17, the S motor Ms is energized to cause the mirror-down operation to start. In Step #18, when the inhibition of timer interruption is cancelled, the timer interruption is enabled. The process of the main routine proceeds to Step #19, in which the process loops until the time tc required for the mirror-up operation plus a predetermined period of time (for example, 100 ms) passes.

In the meantime, since the timer interruption at predetermined time intervals is enabled, the process proceeds from Step #41 to Step #51 through Step #42 and the mirror-down/film winding routine shown in FIG. 7 is executed. The routine of FIG. 7 is divided into two routines; one routine is a routine which includes Step #501 to Step #509 and in which control associated with the mirror-down operation is carried out, while the other routine is a routine which includes Step #510 to Step #518 and in which film winding is carried out. After the process has passed through selected steps in the former routine, it proceeds to Step #510. After Step #510, the process executes the latter routine and returns to the main routine.

After the returning step, the process returns to the main routine shown in FIG. 4. Since, in Step #19, the process merely loops until the estimated time period required for the mirror-down operation passes, the timer interruption routine of FIG. 5 is executed at predetermined time intervals during this wait time. The process proceeds from Step #41 to Step #51 through Step #42, and the routine of FIG. 7 is again called. This portion of the routine successively interrupts the main routine from the beginning to the end of the film winding/mirror-down operation. In the mirror-down/film winding routine, branching occurs in Step #501. Since the flows of the aforementioned two routines are independent of each other, the respective routines will be separately explained.

The flow from Step #501 to Step #509 will now be described below in detail. In Step #501, it is checked whether or not the S motor Ms is being driven. If it is being driven, the process proceeds to Step #502, while if it is not being driven, the process proceeds to Step #504. In this case, since the S motor Ms is being driven by energization in Step #17, the process proceeds to Step #502. In Step #502, it is checked whether or not the charge switch SWch is on. If the charge switch SWch is on, the process proceeds to Step #503, while if the charge switch SWch is off, the process proceeds to Step #510. In this case, since the carge switch SWch remains on for a certain period of time after the S motor Ms has been energized, the process proceeds to Step #510. When the driving process required for the mirror-down.shutter-charge operation has been completed, the charge switch SWch is switched on (t=t8 in FIG. 8), and the process proceeds from Step #502 to Step #503. In Step #503, the brake is applied by causing a short across the S motor Ms, and the process then proceeds to Step #510.

On the other hand, if the S motor Ms is braked in Step #510 and when the process proceeds to Step #510 at the time of the next interruption, it is determined in Step #510 that the S motor Ms is braked and the driving of the S motor Ms is therefore stopped. Accordingly, the process proceeds from Step #501 to Step #504. In Step #504, it is checked whether or not the S motor Ms is being braked. If the S motor Ms is being braked, the process proceeds to Step #505, while if it is not being braked, the process proceeds to Step #508. In this case, since the S motor Ms is being braked, the process proceeds to Step #505, in which case the time which elapses after the application of the brake of the S motor Ms is measured. If the elapsed time reaches 20 ms, the process proceeds to Step #510, while if the elapsed time has not yet reached 20 ms, the process proceeds to Step #510. If 20 ms passes (t=t9 in FIG. 8) after the brake of the S motor has been applied, the process proceeds from Step #505 to Step #506. In Step #506, the energization of the S motor Ms as well as the braked state of the same is cancelled. In Step #507, the solenoid S is again energized, and the process proceeds to Step #510.

When the process proceeds from Step #501 to Step #504 at the time of the next interruption, the process proceeds to Step #508 since the braking of the S motor Ms has been completed. In Step #508, it is checked whether or not the charge switch SWch is off. If the charge switch SWch is off, the process proceeds to Step #509, while if the charge switch SWch is on, the process proceeds to Step #510. When the disengagement lever 4 is disengaged by energizing the solenoid S, the charge switch SWch is switched off (t=t10 in FIG. 8), and the process proceeds from Step #508 to Step #509. In Step #509, the energization of the solenoid S is cancelled. After Step #509 has been processed, the process proceeds to Step #510. The process proceeds while executing Step #501, Step #504, Step #508, Step #509, and Step #510 in that order before all the steps of film winding have been completed.

Then, the flow from Step #510 to Step #518 will be described below. In Step #510, it is checked whether or not film winding is being performed. If the film winding is being performed, the process proceeds to Step #511, while if the film winding is being performed, the process proceeds to Step #516. In this case, since the film winding has already been started in Step #15, the process proceeds to Step #511. In Step #511, it is checked whether or not the reference switch SWk has been switched off. If the reference switch SWk has not been switched off, the process proceeds to Step #512, while if the reference switch SWk has been switched off, the process proceeds to Step #514. Since the reference switch SWk is on immediately after the film winding has been started, the process proceeds to Step #512. In Step #512, it is checked whether or not the reference switch SWk is off. If the reference switch SWk is off, the process proceeds to Step #513, while if the reference switch SWk is on, the process returns.

When the photographic film is transported by a half frame, the reference switch SWk is switched off. Accordingly, the film winding process proceeds while executing Step #512 to the return step. When the film winding for a half frame is effected, the reference switch SWk is switched off (t=t0 in FIG. 8), $ and the process proceeds from Step #512 to Step #513. In Step #513, elements, such as a pulse counter for film transportation, are reset, and the process proceeds to Step #514. In Step #514, it is checked whether or not the number of F encoder pulses for film transportation has reached fifty seven. If fifty seven is reached, the process proceeds to Step #515, while, if fifty seven has not yet reached, the process returns.

The film winding is continued in accordance with the flow from Step #514 to the return step until a certain period of time has passed after the photographic film has been wound by a half frame and the reference switch SWk has been switched off. When the photographic film is wound by a length corresponding to fifty seven pulses (t=t12 in FIG. 8), the process proceeds from Step #514 to Step #515. In Step #515, brake is applied to the F motor Mf and the elements, such as flags, required to complete the film winding are set. The process then returns. At the time of the next interruption, since the F motor Mf has already been stopped and, therefore, the winding operation is not being performed, the process proceeds from Step #510 to Step #516, where it is checked whether or not the braking of the F motor Mf after the completion of the film winding is being carried out. If the F motor Mf is being braked, the process proceeds to Step #517. If the F motor Mf is not being braked, the process returns. In this case, since the film winding has just been completed and the F motor Mf is being braked, the process proceeds to Step #517. In Step #517, it is checked whether or not a period of 20 ms has passed after the braking of the F motor Mf has been started. If 20 ms is not reached, the process returns so as to continue the last state. If 20 ms is not reached (t=t13 in FIG. 8), the process proceeds to Step #518, in which case the energization of the F motor Mf is cancelled, and the process then returns.

Which of the film winding operation and the shutter charging operation completes earlier depends upon factors such as the capacity of a battery and the load on the photographic film. In the example shown in FIG. 8, the step of film transportation completes earlier than the shutter charging operation. However, it will be readily understood from the explanation given to the flow of FIG. 7 that an alteration may occur in the order of the timings of t=t8, t9 and t10 or the order of the timings of t=t12 and t13.

The process of FIG. 7 is a process included in the interruption routine and, during the execution of the process of FIG. 7, the process of the main routine of FIG. 4 continues to loop in Step #19. More specifically, in Step #19, the process remains looping before a period equivalent to the time tc (the time required for the mirror-up operation) plus 100 ms passes after the S motor Ms has been energized during the second period (from the mirror-down operation to the shutter charging operation). When such a period passes (t=tx in FIG. 8), the process is allowed to proceed to Step #1. In Step #1, the photometric routine is started and AE- and AF-photometry for the exposure of the next frame is carried out. When the phtometric routine in Step #1 has been completed, the processes of Steps #2 to #4 are then executed so that arithmetic operation for AE and AF are performed on the basis of the newly obtained photometric values. The results of the arithmetic operations are displayed in a predetermined fashion.

The process then proceeds to Step #5. In Step #5, as long as the film winding is not completed, the process returns from Step #5 to Step #1 and, therefore, the driving of the AF motor Maf in Step #6 is not executed. In addition, since the process does not proceed to Step #7, release inhibition is not cancelled. If the film winding is completed, the process is allowed to proceed from Step #5 to Step #6. The process, in turn, proceeds from Step #6 to Step #7 in accordance with the instruction given in an AF mode which is selected. For example, if the AF-S mode which is a focus priority mode is selected, the process proceeds from Step #6 to Step #7 when the driving of the AF motor Maf is completed. If the AF-C mode which is a release priority mode is selected, the process immediately proceeds to Step #7, where release inhibition is cancelled. Thus, the process becomes able to proceed from Step #43 through Step #44 to Step #45 as shown in FIG. 5, in which case the release operation is enabled. If the release switch SWO is on, the next sequence starts in accordance with the instruction given in a film transportation mode which is selected.

More specifically, if the CH mode which corresponds to the film transporting speeds of 3 or more frames per second is selected, the process proceeds from Step #45 through Step #49 to Step #10, in which case the next shutter release operation is enabled. If the CL mode which corresponds to the film transporting speeds of about 2 frames per second is selected, the process proceeds while executing Step #45, Step #46, Step #47, Step #49 and Step #10 in that order, in which case, after a delay of 200 ms, the process enters the release sequence. If the S mode is selected, the process proceeds while executing Step #45, Step #46, Step #47, Step #49 and Step #10 in that order, in which case, after the release switch SWO has been switched off, the process enters the release sequence.

In FIG. 8, at the time of t=tx, mirror bounds calms down irrespective of the state of source voltage for the following reason. As explained in connection with the mechanism of FIG. 3, the charge cam 2 is rotated through 85° for the mirror-up operation, while, for the mirror-down operation, the charge cam 2 is rotated through 275°. Accordingly, the mirror-down operation takes longer time than the mirror-up operation. In the embodiment of the present invention, a predetermined time period (100 ms) is added to the time tc required for the mirror-up operation, which has been stored at Step #106 in the mirror-up routine of FIG. 6A, and the total time period thus obtained is utilized as the estimated time period required for the mirror-down operation. As the source voltage becomes higher, the time tc required for the mirror-up operation becomes shorter, while as the source voltage becomes lower, the time tc becomes longer. Accordingly, since the estimated time period for the mirror-down operation includes variations in time period due to the influence of level variations in source voltage, it follows that the predetermined time period of 100 ms has an optimized length which includes little wasteful time, unlike the case where a period of fixed value is utilized as the estimated time period. Needless to say, the value of 100 ms need not necessarily be added to the time tc, depending upon the way in which the first period and the second period are separated from each other; for example, 100 ms may be subtracted from the time tc as occasion demands.

In order to simplify the mechanism, the time instant that the process required for the mirror-down operation is completed, for example, the respective time instants of t=t8, t9, and t10 in FIG. 8 may be substituted for the timing of start of photometry. In this case, however, since the mirror-down process includes the process required to complete shutter charge, it will be impossible to avoid the disadvantage that the timing of start of photometry is delayed from the timing of t=tx as shown in the timing chart of FIG. 8.

As described above, in accordance with the present invention, since the mechanism is arranged to measure the time period required from the moment that shutter release operation is started until the moment that mirror-up operation is completed and then to start photometry after the time period determined by computation based on the time period required for the mirror-up operation has passed after the completion of shutter running. Accordingly, variations in the length of the aforesaid time period can be absorbed during the mirror-up time, whereby, even if variations occur in the level of the source voltage or in the load level of each motor, it is possible to achieve efficient winding with extremely reduced wasteful time. Accordingly, the film transporting speed can be further increased.

What is claimed is:

1. A single-reflex camera, comprising:
   a movable mirror provided on a photographing optical path;
   driving means for driving said movable mirror by means of an electrical motor, said driving means being arranged to cause said movable mirror to move out of said photographing optical path in a first cycle of driving prior to exposure and to cause said movable mirror to move onto said photographing optical path in a second cycle of driving following said first cycle of driving;
   photometric means arranged to receive a portion of a light flux which passes through said photographing optical path and which is incident upon said movable mirror and then to generate information concerning the brightness of an object;
   counting means for counting the time period required for said first cycle of driving of said driving means; and
   determining means for determining, on the basis of said required time period counted by said counting means, the time interval between the starting of said first cycle of driving of said driving means and the starting of the operation of said photometric means.

2. A single-reflex camera according to claim 1, wherein said determining means determines said time interval by adding a predetermined time period to said required time period counted by said counting means.

3. A single-reflex camera according to claim 1, wherein said counting means includes switch means for generating an output in synchronization with the completion of said first cycle of driving of said driving means, said counting means being arranged to start counting in response to the starting of said first cycle of driving and to terminate counting in response to the output of said switch means.

4. A single-reflex camera according to claim 1, wherein said photometric means includes a photosensor device arranged to generate an output corresponding to the intensity of said portion of said light flux conducted by way of said movable mirror, said photometric means being arranged to generate said information on the basis of said output from said photosensor device and in response to said determining means.

5. A single-reflex camera according to claim 1, further including timer means for counting said determined time interval, said photometric means being arranged to start its operation in response to said timer means.

* * * * *